United States Patent [19]

Davis

[11] Patent Number: 4,728,548

[45] Date of Patent: Mar. 1, 1988

[54] POLYAMIDE COMPOSITIONS

[75] Inventor: Burns Davis, Kingsport, Tenn.

[73] Assignee: Eastman Kodak Company, Rochester, N.Y.

[21] Appl. No.: 12,928

[22] Filed: Feb. 9, 1987

[51] Int. Cl.[4] .................... B65D 1/00; B32B 27/34; C08G 69/26
[52] U.S. Cl. .................... 428/35; 428/474.4; 528/341
[58] Field of Search .............. 528/341, 319, 208; 549/233; 428/474.4, 35

[56] References Cited

U.S. PATENT DOCUMENTS

| | | | |
|---|---|---|---|
| 3,408,334 | 10/1968 | Caldwell et al. | 528/319 |
| 3,409,638 | 11/1968 | Selwitz | 549/233 |
| 3,649,496 | 3/1972 | Nesterovsky et al. | 204/162 HE |
| 4,261,473 | 4/1981 | Yamada et al. | 428/35 X |
| 4,482,695 | 11/1984 | Barbee et al. | 528/208 |

*Primary Examiner*—Thomas J. Herbert
*Attorney, Agent, or Firm*—John F. Stevens; William P. Heath, Jr.

[57] ABSTRACT

A polyamide for use in fabrication of containers having good oxygen barrier properties and a high heat deflection temperature. The polyamides are prepared from benzylsuccinic acids and piperazines.

14 Claims, No Drawings

POLYAMIDE COMPOSITIONS

FIELD OF THE INVENTION

The invention relates to novel polyamide compositions which are useful as packaging materials. The polyamides are derived from piperazines and benzylsuccinic acids. The invention also relates to films and containers which are formed from the polyamides of the present invention.

BACKGROUND OF THE INVENTION

It has been known in the art that, compared to certain other classes of polymers, homopolyamides and copolyamides exhibit relatively good gas barrier properties. Typical prior art polyamides are disclosed, for example, in U.S. Pat. No. 4,261,473. Examples of such polyamides include polycaprolactam (Nylon 6), poly-ω-aminoheptanoic acid (Nylon 7), poly-ω-aminononanoic acid (Nylon 9), polyundecanamide (Nylon 11), polylauryllactam (Nylon 12), polyethylene adipamide (Nylon 2-6), polytetramethylene adipamide (Nylon 4-6), polyhexamethylene adipamide (Nylon 6-6), polyhexamethylene sebacamide (Nylon 6-10), polyoctamethylene adipamide (Nylon 8-6), polydecamethylene adipamide (Nylon 10-6) and polydodecamethylene sebacamide (Nylon 12-10).

Polyamides prepared from aromatic amino compounds are disclosed in U.S. Pat. No. 3,408,334. The aromatic amines used in these polyamides contain amino groups bonded directly to an aromatic ring. Typical examples of suitable diamines are metaphenylenediamine, para-phenylenediamine, isomeric diaminoxylenes, etc. The patent further discloses that p-phenylenedioxydiacetic acid and similar compounds can be employed in the preparation of polyamides.

U.S. Pat. No. 4,482,695 (Barbee et al.) discloses polyamide containers having unexpectedly superior gas barrier properties. Typically these polyamides are prepared from an aliphatic diamine and a dicarboxylic acid which is a diacetic acid. The disclosed polyamides are not of the type employed in the present invention.

SUMMARY OF THE INVENTION

The present invention relates to a polymer having recurring units of the formula

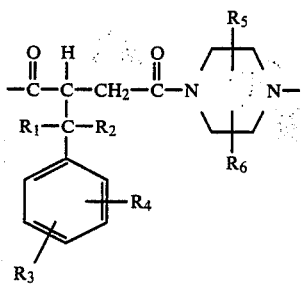

wherein $R_1$ and $R_2$ are selected from hydrogen or methyl and $R_3$, $R_4$, $R_5$ and $R_6$ are selected from hydrogen and lower alkyl. The polymer of the invention has an inherent viscosity of at least 0.4.

The present invention also provides a container having excellent gas barrier properties formed from a polyamide as described in the preceding paragraph.

DETAILED DESCRIPTION OF THE PREFERRED EMBODIMENTS

The present invention relates to a polyamide composition which is the reaction product of a diamine component and a diacid component. The diamine component is a cycloaliphatic diamine and more particularly the diamine component is a piperazine. Thus, examples of suitable cycloaliphatic diamines include piperazine, 2-methylpiperazine, 2,5-dimethylpiperazine, 2,6-dimethylpiperazine and the like, or a mixture thereof. The diacid component is a benzylsuccinic acid having the general formula

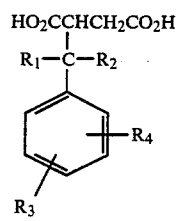

wherein $R_1$ and $R_2$ are hydrogen or methyl and $R_3$ and $R_4$ are hydrogen, or lower alkyl, preferably of up to six carbon atoms and more preferably methyl, ethyl, isopropyl and tertiary butyl. The benzylsuccinic acid can be used in the form of a benzylsuccinic acid anhydride, a benzylsuccinic acid, a benzylsuccinic acid halide or a benzylsuccinic acid ester. Of the benzylsuccinic acid esters the lower alkyl ($C_1$-$C_4$) esters are preferred.

The benzylsuccinic acids used in this invention can be prepared from maleic anhydride and the appropriate hydrocarbon such as toluene and meta-xylene using an organic peroxide. The methods of preparation are described in U.S. Pat. Nos. 3,409,638 and 3,649,496 and J. Org. Chem., Vol. 21, No. 1 (1956) which are hereby incorporated by reference.

The polyamide which is employed in the present invention exhibits an inherent viscosity of about 0.4 to 1.5. The inherent viscosity is measured at 25° C. in a 60/40 by weight mixture of phenol/tetrachloroethane at a concentration of 0.5 g/100 ml. Polymers having an inherent viscosity within this range are of sufficiently high molecular weight to be used in the present invention.

The polyamides of the present invention are synthesized by methods generally known in the art for producing polyamides. The diamine and diacid components are preferably reacted in approximately stoichiometic quantities. Diacid chlorides, esters, and the like can be used. A solvent may be used in the preparation of the polyamide.

In general, the reaction involves heating approximately stoichiometric quantities of the diamine and diacid components in the presence of a small amount of water and in an inert atmosphere, such as nitrogen, with stirring. A slight excess of the diamine may be desirable. Water is allowed to distill as the temperature is raised so as to facilitate reaction between the diamine and the dicarboxylic acid. Temperatures in the range of about 180° to 330° C. may be employed, with the preferred range being about 200° to 310° C. Preferably, the final stages of the reaction are conducted under a vacuum. The polymerization reaction is typically conducted for a period of time of about 2 to 30 hours. The preparation of the polyamide does not require the use of a catalyst, and catalysts typically are not employed during the reaction period. However, suitable catalysts which have been disclosed in the literature can be employed if desired.

It is often desirable to employ a procedure which involves the preparation of a salt from the diacid and the diamine. By means of such a procedure, better control of the stoichimetry can be obtained. Such salts are well known in the art and can be prepared by heating the diamine and diacid to reflux temperature in the presence of a solvent. The salts which are formed represent an ionic combination of the diamine and diacid. The salts can be isolated in solid form and have well-defined melting points. The salts which are obtained can be heated with stirring so as to melt the salt, thereby forming a polymeric product accompanied by the formation and release of water. Preferably, as the salt is heated to its melting point, a small amount of water such as about 10–50% by weight, based on the weight of the salt is added to the reaction system to aid in the removal of oxygen from the system. The preparation of the polyamide proceeds as described above.

The oxygen permeability of the polyamide is determined in cubic centimeters permeating a one-mil thick sample, 100 inches square, for a 24-hour period under an oxygen partial pressure difference of one atmosphere at 30° C. using a MOCON Oxtran 100 instrument. The film used to measure permeability may be up to 3–4 mils in thickness if the permeability is converted to a one-mil basis using conventional calculations.

Of course, suitable additives, such as dyes, pigments, plasticizers, fillers, antioxidants, stabilizers, etc., may be employed in conventional amounts. Such additives may be added directly to the reaction or may be added to the final polymer.

The polyamides described above may be formed into the containers and the like by conventional plastic processing techniques. For example, sheets, films, containers and other like structures can be formed by well-known extrusion or molding techniques.

Film or sheet material made in accordance with the present invention is strong, flexible, and clear. Such materials can be formed into articles such as wrappers, bags, and the like. The polyamides may also be used to form a laminating layer, such as between two or more permeable layers of film. It may be desirable to include a tie layer (e.g. a polyolefin-based tie layer, a polyesteramide tie layer, etc.) between the permeable layers of film and the layers of the polyamides described above. The polyamides described above may also be used for dip coating a container from a polymer solution in order to improve the barrier properties of the container.

Molded containers can be made from the above-described polyamides by compression molding, blow molding, or other such molding techniques, all of which are well known in the art.

Containers may also be formed by coextruding (e.g., in the form of a "pipe" or otherwise) a layer of the present polyamide together with some other suitable thermoplastic resin. One or more tie layers may be desirable in such co-extruded articles.

Resins which are suitable for forming laminates or coextruded articles in conjunction with the polyamides discloses herein include polyethylene terephthalate, poly(1,4-cyclohexylene terephthalate), and other such well known polyesters.

The above-described films and containers made of a polyamide in accordance with the present invention exhibit low oxygen permeability, a high heat deflection temperature and high glass transition temperatures. Typically oxygen permeability is between about 1.0 and about 10.0 cc mil/100 in.$^2$ 24 hr. atmosphere. Thus, the above-described containers are ideal for packaging applications requiring a high heat deflection temperature and good oxygen barrier properties.

The invention will be further illustrated by the following example although it will be understood that this example is included merely for the purpose of illustration and is not intended to limit the scope of the invention.

EXAMPLE 1

Preparation of a Polyamide from Piperazine and Benzylsuccinic Acid

A 500-ml, single neck, glass flask is charged with 156 grams (0.75 mol) of benzylsuccinic acid, 64.5 grams (0.75 mol) of piperazine, and 50 ml of distilled water. The reaction is conducted by heating this mixture of materials with stirring under nitrogen for 10 minutes at 150° C., 30 minutes at 200° C., and 30 minutes at 260° C. During this time, water is allowed to distill from the reaction. The nitrogen gas is removed and the reaction is placed under a reduced pressure of about 0.1 millimeter of mercury for about three hours at 260° C. A viscous polymer is formed which has an inherent viscosity of 1.00. The polymer is ground and dried. Sufficient additional polymer is made for extrusion into film and molding into test bars. Film is extruded at about 270° C. on a Brabender extruder and bars are molded at about 290° C. on a Watson Stillman molding machine. The polymer has a glass transition temperature of about 152° C. and an oxygen permeability of about 8.3 cc mil/100 in$^2$ 24 hr atmosphere. The molded bars had an elongation of 14% and a tensile strength of 11,300 psi determined according to ASTM D638. ASTM D648 tests showed the bars to have a heat distortion temperature of about 119° C. at 264 psi.

While the invention has been described in detail with particular reference to preferred embodiments thereof, it will be understood that variations and modifications can be made within the spirit of the invention and that the scope of the invention is to be defined by the claims appended hereto.

What is claimed is:

1. A container which is formed from a polyamide comprising recurring units of the formula

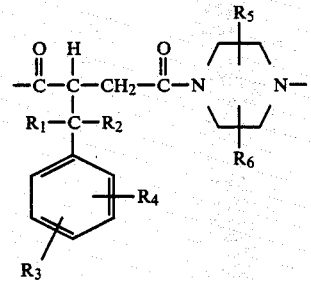

wherein $R_1$ and $R_2$ are hydrogen or methyl and $R_3$, $R_4$, $R_5$ and $R_6$ are selected from hydrogen and lower alkyls.

2. The container of claim 1 wherein said polyamide is poly(piperazinebenzylsuccinamide).

3. The container of claim 1 wherein said polyamide is poly(2,6-dimethylpiperazinebenzylsuccinamide).

4. The container of claim 1 wherein said polyamide is poly(2-methylpiperazinebenzylsuccinamide).

5. The container of claim 1 wherein said polyamide is poly(2,5-dimethylpiperazinebenzylsuccinamide).

6. A fiber- and film-forming polymer comprising recurring units of the formula

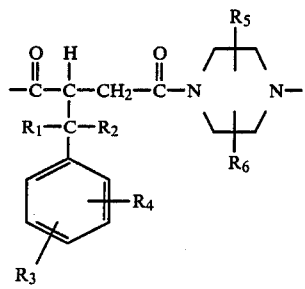

wherein $R_1$ and $R_2$ are hydrogen or methyl and $R_3$, $R_4$, $R_5$ and $R_6$ are selected from the group consisting of hydrogen and lower alkyl; the inherent viscosity of said polymer being at least 0.4.

7. Poly(piperazinebenzylsuccinamide), a polyamide according to claim 6.

8. Poly(2,6-dimethylpiperazinebenzylsuccinamide), a polyamide according to claim 6.

9. Poly(2-methylpiperazinebenzylsuccinamide), a polyamide according to claim 6.

10. Poly(2,5-dimethylpiperazinebenzylsuccinamide), a polyamide according to claim 6.

11. A film formed from the polyamide of claim 6.

12. A coextruded article comprising the polyamide of claim 6.

13. A laminated article comprising the polyamide of claim 6.

14. A coated article comprising an article coated with the polyamide of claim 6.

* * * * *